US012812559B2

(12) United States Patent
Pu et al.

(10) Patent No.: US 12,812,559 B2
(45) Date of Patent: Nov. 24, 2026

(54) METHOD FOR TRANSMISSION CONTROL TO SUPPORT UPLINK POWER SHARING AND COMMUNICATION DEVICE

(71) Applicant: VIVO MOBILE COMMUNICATION CO., LTD., Guangdong (CN)

(72) Inventors: Wenjuan Pu, Guangdong (CN); Xiaodong Yang, Guangdong (CN); Xiaodong Sun, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 547 days.

(21) Appl. No.: 17/957,007

(22) Filed: Sep. 30, 2022

(65) Prior Publication Data

US 2023/0013332 A1 Jan. 19, 2023

Related U.S. Application Data

(63) Continuation of application No. PCT/CN2021/082949, filed on Mar. 25, 2021.

(30) Foreign Application Priority Data

Mar. 30, 2020 (CN) ........................ 202010238952.2

(51) Int. Cl.

*H04W 52/34* (2009.01)
*H04W 52/14* (2009.01)
*H04W 52/42* (2009.01)

(52) U.S. Cl.

CPC ......... *H04W 52/34* (2013.01); *H04W 52/146* (2013.01); *H04W 52/42* (2013.01)

(58) Field of Classification Search

CPC . H04W 52/146; H04W 52/34; H04W 52/367; H04W 52/346; H04W 76/15;

(Continued)

(56) References Cited

U.S. PATENT DOCUMENTS

| | | | | |
|---|---|---|---|---|
| 11,985,656 B2 * | 5/2024 | Ahn | ...................... | H04L 5/0051 |
| 2015/0005027 A1 * | 1/2015 | Zeng | ..................... | H04W 72/20 455/522 |

(Continued)

FOREIGN PATENT DOCUMENTS

| | | |
|---|---|---|
| CN | 107113740 A | 8/2017 |
| CN | 110831137 A | 2/2020 |

(Continued)

OTHER PUBLICATIONS

3GPP TSG RAN meeting #89-e Draft RP-201532 Electronic meeting, Sep. 14-18, 2020, RAN1-98bis (Oct. 2019), RAN1-99 (Nov. 2019).*

(Continued)

*Primary Examiner* — Golam Sorowar

(74) *Attorney, Agent, or Firm* — Perilla Knox & Hildebrandt LLP; Kenneth A. Knox

(57) ABSTRACT

Embodiments of the present invention provide a method for transmission control and a device. The method includes: sending first information, where the first information is used to notify a master node and/or secondary node of a terminal of a power control parameter used by the terminal in an uplink power sharing mechanism for dual connectivity.

8 Claims, 3 Drawing Sheets

(58) Field of Classification Search
CPC ... H04W 72/21; H04W 88/06; H04W 52/325; H04W 72/0446; H04W 52/365; H04W 72/04; H04W 72/0473; H04W 72/569; H04W 76/16; H04W 52/281; H04W 72/00; H04W 72/12; H04W 76/00; H04W 16/32; H04W 72/044; H04W 24/08; H04W 52/16; H04W 74/0833; H04W 24/10; H04W 72/23
See application file for complete search history.

(56) References Cited

U.S. PATENT DOCUMENTS

| | | | | |
|---|---|---|---|---|
| 2015/0223212 | A1* | 8/2015 | Der Velde | H04W 76/15<br>370/329 |
| 2015/0282104 | A1* | 10/2015 | Damnjanovic | H04W 52/365<br>455/522 |
| 2016/0255593 | A1 | 9/2016 | Blankenship et al. | |
| 2016/0255665 | A1 | 9/2016 | Futaki | |
| 2016/0323834 | A1* | 11/2016 | Rahman | H04J 11/0083 |
| 2018/0295585 | A1* | 10/2018 | Hwang | H04W 52/288 |
| 2019/0037565 | A1* | 1/2019 | Zheng | H04W 72/21 |
| 2019/0261359 | A1 | 8/2019 | Wang et al. | |
| 2019/0320396 | A1 | 10/2019 | Bagheri et al. | |
| 2019/0364517 | A1 | 11/2019 | Gaal et al. | |
| 2022/0104149 | A1* | 3/2022 | Takeda | H04W 52/346 |
| 2022/0191802 | A1* | 6/2022 | Koorapaty | H04W 52/34 |

FOREIGN PATENT DOCUMENTS

| | | | |
|---|---|---|---|
| CN | 111757450 | A | 10/2020 |
| JP | 2020500469 | A | 1/2020 |

OTHER PUBLICATIONS

Qualcomm Incorporated, Remaining issues on uplink power control for NR-DC, 3GPP TSG-RAN WGI #100, RI-2000980, e-Meeting, Feb. 24-Mar. 6, 2020.
Apple, Outcome of email thread [100e-NR-LTE_NR_DC_CA_enh-ULPC-02], 3GPP TSG-RAN WG1 Meeting #100-e, R1-2001302, Online, Feb. 24-Mar. 6, 2020.
Vivo, Summary of power Control NR DC, 3GPP TSG-RAN WG2 Meeting #109 electronic, R2-2002256, E-Meeting, Feb. 28-Mar. 6, 2020.
Hong He, TSG RAN WG1, LS on uplink power control for NR-NR Dual-Connectivity, Release-16, 3GPP TSG-RAN WG1 Meeting #100, R1-2001421, e-Meeting, Feb. 24-Mar. 6, 2020.
Alcatel-Lucent, Alcatel-Lucent Shanghai Bell, SeNB configuration/reconfiguration and UE capability handling, 3GPP TSG RAN WG2 Meeting #84, R2-134378, Nov. 11-15, 2013, San Francisco, U.S.A.
CATT, UE capability coordination, 3GPP TSG RAN WG2 Meeting #85bis, R2-141577, Mar. 31-Apr. 4, 2014, Valencia, Spain.
Apple Inc., Feature Lead Summary #3 for Uplink Power Control for NR-NR DC, R1-1913550, Agenda Item 7.2.13.1, 3GPP TSG-RAN WG1 #99, Nov. 18-22, 2019, Reno, USA,.

* cited by examiner

METHOD FOR TRANSMISSION CONTROL TO SUPPORT UPLINK POWER SHARING AND COMMUNICATION DEVICE

CROSS-REFERENCE TO RELATED APPLICATIONS

This application is a continuation application of International Application No. PCT/CN2021/082949 filed on Mar. 25, 2021, which claims priority to Chinese Patent Application No. 202010238952.2, filed in China on Mar. 30, 2020, which are incorporated herein by reference in their entireties.

TECHNICAL FIELD

Embodiments of the present invention relate to the field of communications technologies, and specifically, to a method for transmission control and a device.

BACKGROUND

In dual connectivity, a terminal (for example, user equipment (UE)) can be provided with resources for two network nodes (access network elements), where one of the network nodes is called a master node (MN), and the other one is called a secondary node (SN).

At each network node, carrier aggregation CA) is used, where the UE is configured with a list of serving cells, or a cell group (CG), controlled by the node. A cell group controlled by the MN is a master cell group (MCG), and a cell group controlled by the secondary node is a secondary cell group (SCG). Each cell group includes a special cell (SpCell) and a list of secondary cells (Scell). In the MCG, the special cell is called a primary cell (PCell), and in the SCG, the special cell is called a primary secondary cell (PSCell). In one cell group, the SpCell uses a primary carrier, secondary cells use secondary carriers, and resource scheduling in one cell group is performed by the SpCell.

In an uplink power sharing mechanism for dual connectivity, the UE needs to adjust its uplink transmission power in the MCG or SCG to ensure that a sum of uplink transmission powers of simultaneous MCG and SCG uplink transmissions does not exceed a maximum uplink transmission power of the terminal. However, the network side does not know the uplink transmission power in the MCG or SCG used by the terminal during the adjustment and therefore is unable to perform transmission control accordingly.

SUMMARY

An objective of embodiments of the present invention is to provide a method for transmission control and a device, to resolve a problem that a network side does not know the uplink transmission power in an MCG or SCG used by a terminal during adjustment and therefore cannot perform transmission control accordingly.

According to a first aspect, an embodiment of the present invention provides a method for transmission control, applied to a terminal and including:

sending first information, where the first information is used to notify a master node and/or secondary node of the terminal of a power control parameter used by the terminal in an uplink power sharing mechanism for dual connectivity.

According to a second aspect, an embodiment of the present invention further provides a method for transmission control, applied to a network device and including:

receiving first information from a terminal, where the first information is used to notify a master node and/or secondary node of the terminal of a power control parameter used by the terminal in an uplink power sharing mechanism for dual connectivity; and performing transmission control for the terminal based on the first information.

According to a third aspect, an embodiment of the present invention further provides a terminal, including:

a first sending module, configured to send first information, where the first information is used to notify a master node and/or secondary node of the terminal of a power control parameter used by the terminal in an uplink power sharing mechanism for dual connectivity.

According to a fourth aspect, an embodiment of the present invention further provides a network device, including:

a receiving module, configured to receive first information from a terminal, where the first information is used to notify a master node and/or secondary node of the terminal of a power control parameter used by the terminal in an uplink power sharing mechanism for dual connectivity; and a control module, configured to perform transmission control for the terminal based on the first information.

According to a fifth aspect, an embodiment of the present invention further provides a communications device, including: a processor, a memory, and a program stored in the memory and capable of running on the processor, where when the program is executed by the processor, the steps of the method for transmission control according to the first aspect or the second aspect are implemented.

According to a sixth aspect, an embodiment of the present invention further provides a computer-readable storage medium, where the computer-readable storage medium stores a computer program, and when the computer program is executed by a processor, the steps of the method for transmission control according to the first aspect or the second aspect are implemented.

According to a seventh aspect, an embodiment of the present invention further provides a computer program product, where the computer program product is stored in a non-volatile storage medium, and the program product is configured to be executed by at least one processor to implement the steps of the method for transmission control according to the first aspect or the second aspect.

According to an eighth aspect, an embodiment of the present invention further provides a communications device, where the communications device is configured to execute the method for transmission control according to the first aspect or the second aspect.

In the embodiments of the present invention, the master node and/or secondary node of the terminal can obtain, based on the first information reported by the terminal, the power control parameter used by the terminal in the uplink power sharing mechanism for dual connectivity. In this way, the master node and/or secondary node of the terminal can perform transmission control based on power allocation of the terminal, for example, performing power control on uplink transmission in the MCG or SCG and optimizing network scheduling, thereby improving uplink transmission quality of the terminal.

BRIEF DESCRIPTION OF DRAWINGS

Other advantages and benefits will become apparent to those of ordinary skill in the art by reading detailed description of the embodiments below. The accompanying drawings are merely intended to illustrate the objectives of the preferred embodiments and are not intended to limit the present invention. Throughout the accompanying drawings, the same reference numerals represent the same components. In the accompanying drawings.

DESCRIPTION OF EMBODIMENTS

Figure 1:
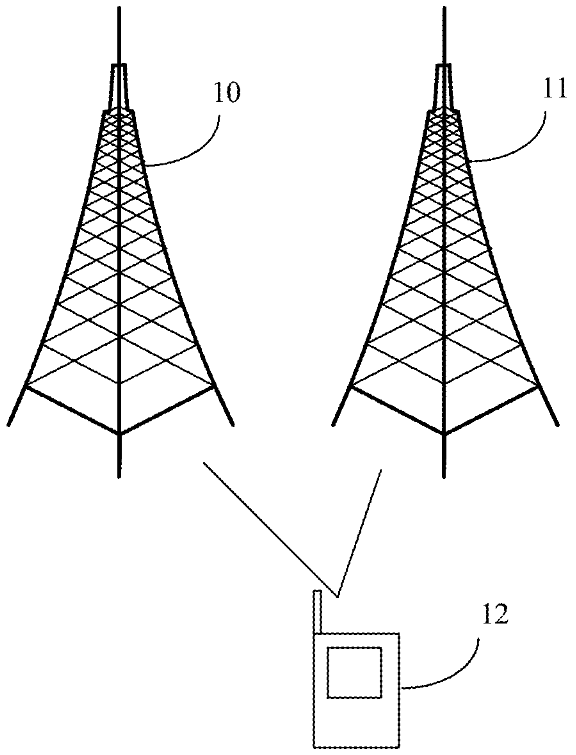
FIG. 1 is a schematic architectural diagram of a wireless communications system according to an embodiment of the present invention.

For better understanding of the embodiments of the present invention, the following technical points are first described.

(1) Main DC/CA Scenarios

Dual connectivity (DC) scenarios can be classified into the following types in terms of radio access technologies and core network types:

- when a core network is an evolved packet core (EPC):
  - EUTRA-NR Dual Connectivity (EN-DC), which is a multi-RAT dual connectivity (MR-DC) architecture, with an evolved NodeB (eNB) acting as an MN and an EN-gNB (in non-standalone Option 3 architecture, a fifth generation (5G) mobile communications technology base station connected to a fourth generation (4G) mobile communications technology core network is called an en-gNB) acting as an SN;
- when a core network is a 5G core (5GC) network:
  - NR_NR Dual Connectivity (NR-DC), which is an MR-DC architecture, with a gNB acting as an MN and a gNB acting as an SN;
  - dual connectivity with 5G NR and 4G radio access network (NR-E-UTRA Dual Connectivity, NE-DC), which is a multi-RAT dual connectivity (MR-DC) architecture, with a gNB acting as an MN and a next generation eNodeB (NG-eNB) acting as an SN; and
  - dual connectivity with 4G radio access network under 5G core network and 5G NR (NG-RAN E-UTRA-NR Dual Connectivity, NGEN-DC), which is an MR-DC architecture with an NG-eNB acting as an MN and with a gNB acting as an SN.

(2) Uplink Power Sharing Mechanism for Dual Connectivity

In NR-DC, it is assumed that a maximum uplink transmission power of UE ($P_{total}$) is constant. When a master cell group MCG uplink transmission and a secondary cell group SCG uplink transmission occur simultaneously (that is, overlap, and specifically, an uplink transmission of any one serving cell in the MCG and an uplink transmission of any one serving cell in the SCG occur simultaneously), the UE needs to adjust an uplink transmission power of the MCG or SCG to ensure that a sum of the uplink transmission powers of the MCG and SCG does not exceed $P_{total}$.

It is assumed that the UE starts the SCG uplink transmission at time T0, where the SCG uplink transmission power is denoted by pwr_SCG. The UE calculates pwr_SCG at time T0 in the following manner:

- Before time T0–T_offset, the UE monitors a physical downlink control channel (PDCCH) of the MCG:
  - If the PDCCH has triggered/indicated that the UE has an MCG uplink transmission that will overlap with the SCG uplink transmission at time T0, the SCG uplink transmission power of the UE should satisfy pwr_SCG<=min{$P_{SCG}$, $P_{total}$–MCG tx power}; where $P_{total}$ is the maximum uplink transmission power of the UE, $P_{SCG}$ is the maximum uplink transmission power of the SCG, and MCG tx power is the uplink transmission power of the MCG;
  - otherwise, pwr_SCG<=$P_{total}$.
- After T0–T_offset, the UE does not expect the PDCCH of the MCG to be used for scheduling the UE to perform an MCG uplink transmission that will overlap with the SCG uplink transmission at time T0.

T_offset is a time offset used by the UE in the uplink power sharing mechanism. The following describes a value of T_offset.

Currently, the value of T_offset is specified as $$\max\{T^{max}_{proc,MCG}, T^{max}_{proc,SCG}\},$$

where $$T^{max}_{proc,MCG}$$

is the maximum processing time of the UE on the MCG and $$T^{max}_{proc,SCG}$$

is the maximum processing time of the UE on the SCG. With "look-ahead (Look-ahead)", the value of $$T^{max}_{proc,MCG} \text{ or } T^{max}_{proc,SCG}$$

is a maximum value of $$T_{proc,2}, T_{proc,CSI}, T^{mux}_{proc,release} \text{ and/or } T^{mux}_{proc,CSI};$$

and "without look-ahead (Without look-ahead)", the value of $T^{max}_{proc,MCG}$ or $T^{max}_{proc,SCG}$ is a maximum value of $T_{proc,2}$, $$T_{proc,CSI}, T^{mux}_{proc,release} \text{ and/or } T^{mux}_{proc,2}.$$

The foregoing parameters are described as follows.

$T_{proc,2}$ is a physical uplink shared channel (PUSCH) processing time of a terminal on an MCG or SCG; and it should be noted that the processing time can be understood as a preparation time, a processing time, a preparation delay, a processing delay, or the like.

$T_{proc,CSI}$ is a channel state information (CSI) processing time of the terminal on the MCG or SCG;

$$T^{mux}_{proc,release}$$

is a semi-persistent scheduling (SPS) physical downlink shared channel (PDSCH) release processing time of the terminal on the MCG or SCG when a PUSCH or physical uplink control channel (PUCCH) for sending an SPS PDSCH release is multiplexed with another PUCCH and/or PUSCH;

$$T^{mux}_{proc,2}$$

is a PUSCH processing time of the terminal when a PUSCH of the MCG or SCG is multiplexed with a PUCCH and/or another PUSCH; and $$T^{mux}_{proc,CSI}$$

is a CSI processing time of the terminal on the MCG or SCG when a PUSCH or PUCCH for sending CSI is multiplexed with another PUCCH and/or PUSCH.

In a process of implementing the present invention, the prior art has the following problems.

(1) UE can calculate $$T^{max}_{proc,MCG} \text{ and } T^{max}_{proc,SCG}$$

based on received MCG configuration, received SCG configuration, and some protocol-specified parameter values, and then obtain T_offset. During [T0–T_offset, T0], there is a risk if an MN schedules the UE (the UE may not monitor uplink scheduling by the MN during this period). It can be understood that during [T0–T_offset, T0], if the MCG chooses not to schedule the UE, there may be a loss, and a larger value of T_offset leads to a greater MCG uplink transmission loss.

When an SN performs SCG configuration for the UE, the SCG configuration can be transmitted to the UE in two manners:

manner 1: transmitted to the UE by the MN on SRB1; and manner 2: transmitted to the UE by the SN on SRB3.

In manner 1, in transmitting SCG configuration information, the MN can obtain $$T^{max}_{proc,MCG}, T^{max}_{proc,SCG}$$

and T_offset in the same way as the UE.

In manner 2, the MN cannot obtain the SCG configuration, and cannot calculate $$T^{max}_{proc,MCG}, T^{max}_{proc,SCG},$$

or T_offset.

(2) Because the UE needs to monitor the PDCCH of the MCG before time T0–T_offset to determine whether there are overlapping transmissions, and if there are overlapping transmissions, uplink transmission power of the MCG needs to be guaranteed first and uplink transmission power of the SCG needs to be adjusted.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such process, method, product, or device. In addition, in the specification and claims, the use of "and/or" represents presence of at least one of the connected objects, for example, "A and/or B" indicates the following three cases: only A, only B, or both A and B.

In the embodiments of the present invention, the terms such as "an example" or "for example" are used to represent giving an example, an instance, or an illustration. Any embodiment or design solution described as "an example" or "for example" in the embodiments of the present invention shall not be interpreted to be more preferential or advantageous than other embodiments or design solutions. To be precise, the terms such as "an example" or "for example" are intended to present a related concept in a specific manner.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. A CDMA system can implement a radio technology such as CDMA2000, and universal terrestrial radio access (UTRA). UTRA includes wideband CDMA (WCDMA) and other CDMA variants. A TDMA system can implement a radio technology such as global system for mobile communications (GSM). An OFDMA system can implement a radio technology such as ultra mobile broadband (UMB), evolved UTRA (E-UTRA), IEEE 802.11 (wireless fidelity (Wi-Fi)), IEEE 802.16 (worldwide interoperability for microwave access (WiMAX)), IEEE 802.20, and Flash-OFDM. UTRA and E-UTRA are both part of the universal mobile telecommunications system (UMTS). LTE and more advanced LTE (for example, LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

The following describes the embodiments of the present invention with reference to the accompanying drawings. A method for transmission control and a device provided in the embodiments of the present invention may be applied to a wireless communications system. FIG. 1 is a schematic architectural diagram of a wireless communications system according to an embodiment of the present invention. As shown in FIG. 1, the wireless communications system may include a network device 10, a network device 11, and a terminal 12. The terminal 12 may be denoted as UE12, and the terminal 12 may perform communication (signaling transmission or data transmission) with the network device 10 and the network device 11. In practical applications, connection between the above devices may be a wireless connection. For ease of visually representing the connection relationship between the devices, a solid line is used to indicate that in FIG. 1.

The network device 10 and the network device 11 provided in this embodiment of the present invention may be base stations. The base station may be a commonly used base station or an evolved node base station (eNB), or may be a network device in a 5G system (for example, a next generation node base station (gNB) or a transmission and reception point (TRP)), or the like.

The terminal 12 provided in this embodiment of the present invention may be a mobile phone, a tablet computer, a notebook computer, an ultra-mobile personal computer (UMPC), a netbook, a personal digital assistant (PDA), a mobile internet device (MID), a wearable device ( ), a vehicle-mounted device, or the like.

Figure 2:
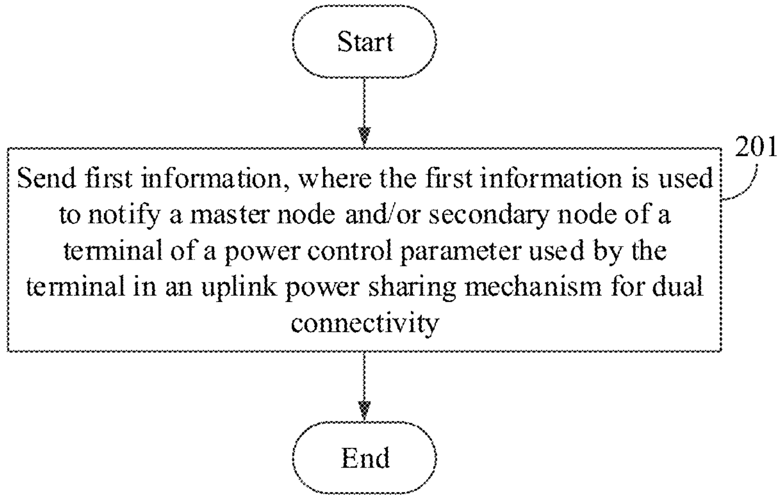
FIG. 2 is a first schematic diagram of a method for transmission control according to an embodiment of the present invention.

Referring to FIG. 2, an embodiment of the present invention further provides a method for transmission control. The method is executed by a terminal, and includes step 201.

Step 201: Send first information, where the first information is used to notify a master node (MN) and/or secondary node of (SN) of the terminal of a power control parameter used by the terminal in an uplink power sharing mechanism for dual connectivity, so that the master node and/or the secondary node performs transmission control based on the first information, such as performing power control on uplink transmission in an MCG or SCG and optimizing network scheduling.

In some embodiments, the terminal sends at least part of the first information directly to the master node or the secondary node, where the first information is used to notify the master node of the terminal of a power control parameter used by the terminal in an uplink power sharing mechanism for dual connectivity. Alternatively, the terminal sends at least part of the first information to the secondary node through the master node, where the first information is used to notify the secondary node of the terminal of a power control parameter used by the terminal in an uplink power sharing mechanism for dual connectivity. Alternatively, the terminal sends at least part of the first information to the master node through the secondary node, where the first information is used to notify the master node of the terminal of a power control parameter used by the terminal in an uplink power sharing mechanism for dual connectivity.

In some embodiments, the terminal sends the first information by using one of the following: (a) terminal assistance information; (b) radio resource control (Radio Resource Control, RRC) reconfiguration complete message; (c) terminal capability; (d) RRC connection resume complete message, and (e) RRC connection establishment complete message. In other words, the terminal may report, to a network device, the first information carried in one of (a) to (e).

In some implementations, the first information may include at least one of the following:

(1) a time offset used in the uplink power sharing mechanism (T_offset)

For example, the MN can obtain T_offset from the first information, and the MN can optimize network scheduling based on the T_offset to avoid MCG uplink transmission loss.

For another example, the SN can obtain T_offset from the first information, and the SN can schedule the UE to perform SCG uplink transmission at an appropriate time, to avoid SCG uplink transmission loss.

(2) a maximum processing time of the terminal on an SCG;

For example, the MN can calculate T_offset based on the maximum processing time of the terminal on the SCG, so as to optimize network scheduling. For example, the UE is scheduled to perform MCG uplink transmission at an appropriate time, to avoid MCG uplink transmission loss.

(3) a maximum processing time of the terminal on an MCG;

For example, the SN can calculate T_offset based on the maximum processing time of the terminal on the MCG, so that the SN can know whether the UE can use a maximum total uplink power for SCG uplink transmission, so as to optimize network scheduling. For example, the UE is scheduled to perform SCG uplink transmission at an appropriate time, to avoid SCG uplink transmission loss.

Optionally, the MN can send the maximum processing time of the terminal on the MCG to the SN, or the terminal sends the maximum processing time of the terminal on the MCG to the SN.

(4) a first parameter set, where the first parameter set is used for calculating the maximum processing time on the MCG For example, the SN can calculate T_offset based on the maximum processing time of the terminal on the MCG, so that the SN can know whether the UE can use a maximum total uplink power for SCG uplink transmission, so as to optimize network scheduling. For example, the UE is scheduled to perform SCG uplink transmission at an appropriate time, to avoid SCG uplink transmission loss.

(5) a second parameter set, where the second parameter set is used for calculating the maximum processing time on the SCG.

For example, the MN can calculate T_offset based on the maximum processing time of the terminal on the SCG, so as to optimize network scheduling. For example, the UE is scheduled to perform MCG uplink transmission at an appropriate time, to avoid MCG uplink transmission loss. It can be understood that the sending at least part of the first information is equivalent to sending one or more of the foregoing power control parameters (1) to (5), or sending at least some parameters in the first parameter set or the second parameter set.

Optionally, the first parameter set includes at least one of the following:

(1) a PUSCH processing time of the terminal on the MCG

It can be understood that the PUSCH processing time is a duration from when the terminal receives the last symbol of a PDCCH for scheduling a PUSCH to when the UE starts to send the PUSCH.

(2) a CSI processing time of the terminal on the MCG (3) a PUSCH processing time of the terminal when a PUSCH of the MCG is multiplexed with a PUCCH and/or another PUSCH It can be understood that the another PUSCH may be a PUSCH other than the PUSCH of the MCG.

(4) a CSI processing time of the terminal on the MCG when a PUSCH or

PUCCH for sending CSI is multiplexed with another PUCCH or PUSCH

It can be understood that the another PUCCH or PUSCH is a PUCCH or PUSCH other than the PUCCH or PUSCH for sending CSI.

(5) an SPS PDSCH release processing time of the terminal on the MCG when a PUSCH or PUCCH for sending an SPS PDSCH release is multiplexed with another PUCCH and/or PUSCH It can be understood that the another PUCCH or PUSCH is a PUCCH or PUSCH other than the PUCCH or PUSCH for sending an SPS PDSCH release.

(6) a third parameter, where the third parameter is used for the terminal to calculate one or more of the following:

a PUSCH processing time on the MCG or a CSI processing time on the MCG; and a PUSCH processing time, CSI processing time, or SPS PDSCH release processing time when a PUCCH or PUSCH of the MCG is multiplexed with another PUCCH and/or PUSCH.

It can be understood that the another PUCCH or PUSCH is a PUCCH or PUSCH other than the PUCCH or PUSCH of the MCG.

It can be understood that the third parameter may not be limited to one parameter, but may be a plurality of parameters.

Optionally, the second parameter set includes at least one of the following:

(1) a PUSCH processing time of the terminal on the SCG;

(2) a CSI processing time of the terminal on the SCG;

(3) a PUSCH processing time of the terminal when a PUSCH of the SCG is multiplexed with a PUCCH and/or another PUSCH;

(4) a CSI processing time of the terminal on the SCG when a PUSCH or PUCCH for sending CSI is multiplexed with another PUCCH or PUSCH;

(5) an SPS PDSCH release processing time of the terminal on the SCG when a PUSCH or PUCCH for sending an SPS PDSCH release is multiplexed with another PUCCH and/or PUSCH; and (6) a fourth parameter, where the fourth parameter is used for the terminal to calculate one or more of the following:

a PUSCH processing time or CSI processing time on the SCG; and a PUSCH processing time, CSI processing time, or SPS PDSCH release processing time when a PUCCH or PUSCH of the SCG is multiplexed with another PUCCH and/or PUSCH.

It can be understood that the fourth parameter may not be limited to one parameter, but may be a plurality of parameters.

In this embodiment of the present invention, the terminal reports to the network side the power control parameter used by the terminal in the uplink power sharing mechanism for dual connectivity. In this way, the master node and/or secondary node of the terminal can perform transmission control based on power allocation of the terminal, for example, performing power control on uplink transmission in the MCG or SCG and optimizing network scheduling, thereby improving uplink transmission quality.

Figure 3:
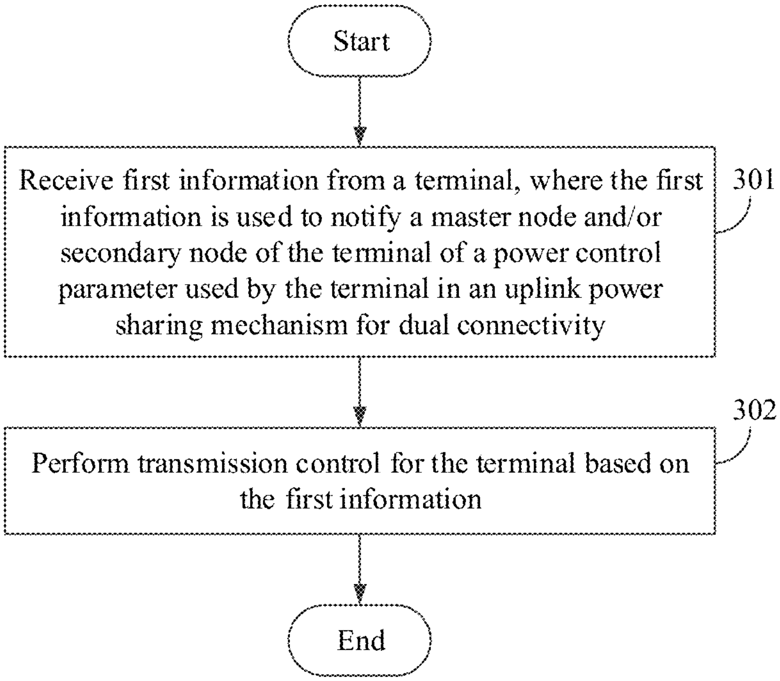
FIG. 3 is a second schematic diagram of a method for transmission control according to an embodiment of the present invention.

Referring to FIG. 3, an embodiment of the present invention further provides a method for transmission control. The method is executed by a network device, and includes step 301 and step 302.

Step 301: Receive first information from a terminal, where the first information is used to notify a master node and/or secondary node of the terminal of a power control parameter used by the terminal in an uplink power sharing mechanism for dual connectivity.

For example, the network device is a secondary node of the terminal, and the secondary node may receive at least part of the first information from the terminal through the master node.

In some implementations, the first information may include at least one of the following:

(1) a time offset used in the uplink power sharing mechanism

For example, the MN can obtain T_offset from the first information, and the MN can optimize network scheduling based on the T_offset to avoid MCG uplink transmission loss. For another example, the SN can obtain T_offset from the first information, and the SN can schedule the UE to perform SCG uplink transmission at an appropriate time, to avoid SCG uplink transmission loss.

(2) a maximum processing time of the terminal on an SCG

For example, the MN can calculate T_offset based on the maximum processing time of the terminal on the SCG, so as to optimize network scheduling. For example, the UE is scheduled to perform MCG uplink transmission at an appropriate time, to avoid MCG uplink transmission loss.

(3) a maximum processing time of the terminal on an MCG

For example, the SN can calculate T_offset based on the maximum processing time of the terminal on the MCG, so that the SN can know whether the UE can use a maximum total uplink power for SCG uplink transmission, so as to optimize network scheduling. For example, the UE is scheduled to perform SCG uplink transmission at an appropriate time, to avoid SCG uplink transmission loss.

(4) a first parameter set, where the first parameter set is used for calculating the maximum processing time on the MCG For example, the SN can calculate T_offset based on the maximum processing time of the terminal on the MCG, so that the SN can know whether the UE can use a maximum total uplink power for SCG uplink transmission, so as to optimize network scheduling. For example, the UE is scheduled to perform SCG uplink transmission at an appropriate time, to avoid SCG uplink transmission loss.

(5) a second parameter set, where the second parameter set is used for calculating the maximum processing time on the SCG.

For example, the MN can calculate T_offset based on the maximum processing time of the terminal on the SCG, so as to optimize network scheduling. For example, the UE is scheduled to perform MCG uplink transmission at an appropriate time, to avoid MCG uplink transmission loss.

It should be noted that for description of the first parameter set and the second parameter set, reference may be made to the embodiment shown in FIG. 2.

Step 302: Perform transmission control for the terminal based on the first information.

Optionally, the performing transmission control for the terminal includes at least one of the following:

(1) controlling an uplink transmission power of the terminal for the master cell group For example, controlling an uplink transmission power of the terminal for any one serving cell in the master cell group.

(2) controlling an uplink transmission power of the terminal for the secondary cell group For example, controlling an uplink transmission power of the terminal for any one serving cell in the secondary cell group.

(3) optimizing network scheduling

For example, adjusting an uplink transmission location of the terminal in the master cell group; or scheduling the terminal to perform uplink transmission at an appropriate time; or controlling the terminal to prioritize or defer uplink transmission, or the like.

Optionally, the network device is a master node of the terminal, and the method further includes: sending second information to the secondary node of the terminal, where the second information includes at least one of the following:

(1) a time offset used in the uplink power sharing mechanism;

(2) a maximum processing time of the terminal on an MCG;

(3) a PUSCH processing time of the terminal on the MCG;

(4) a CSI processing time of the terminal on the MCG;

(5) a PUSCH processing time of the terminal when a PUSCH of the MCG is multiplexed with a PUCCH and/or another PUSCH;

(6) a CSI processing time of the terminal on the MCG when a PUSCH or PUCCH for sending CSI is multiplexed with another PUCCH and/or PUSCH;

(7) an SPS PDSCH release processing time of the terminal on the MCG when a PUSCH or PUCCH for sending an SPS PDSCH release is multiplexed with another PUCCH and/or PUSCH; and (8) a fifth parameter, where the fifth parameter is used for the terminal to calculate one or more of the following:

a PUSCH processing time or CSI processing time on the MCG; and a PUSCH processing time, CSI processing time, or SPS PDSCH release processing time when a PUCCH or PUSCH of the MCG is multiplexed with another PUCCH and/or PUSCH.

It can be understood that the fifth parameter may not be limited to one parameter, but may be a plurality of parameters.

(9) a sixth parameter, where the sixth parameter is used for the secondary node to obtain related configuration information of the terminal on a physical downlink control channel of the MCG.

It can be understood that the sixth parameter may not be limited to one parameter, but may be a plurality of parameters.

It can be understood that with the obtained PDCCH configuration of the terminal on the MCG, the secondary node can infer whether the UE can use a maximum total uplink power for SCG uplink transmission, and then the secondary node optimizes network scheduling or controls the transmission power based on such information.

Optionally, the network device is a secondary node of the terminal, and the method further includes: sending third information to the master node of the terminal, where the third information includes at least one of the following:

(1) a time offset used by the terminal in the uplink power sharing mechanism;

(2) a maximum processing time of the terminal on an SCG;

(3) a PUSCH processing time of the terminal on the SCG;

(4) a CSI processing time of the terminal on the SCG;

(5) a PUSCH processing time of the terminal when a PUSCH of the SCG is multiplexed with a PUCCH and/or another PUSCH;

(6) a CSI processing time of the terminal on the SCG when a PUSCH or PUCCH for sending CSI is multiplexed with another PUCCH or PUSCH;

(7) an SPS PDSCH release processing time of the terminal on the SCG when a PUSCH or PUCCH for sending an SPS PDSCH release is multiplexed with another PUCCH and/or PUSCH; and (8) a seventh parameter, where the seventh parameter is used for the terminal to calculate one or more of the following:

a PUSCH processing time or CSI processing time on the SCG; and a PUSCH processing time, CSI processing time, or SPS PDSCH release processing time when a PUCCH or PUSCH of the SCG is multiplexed with another PUCCH and/or PUSCH It can be understood that the seventh parameter may not be limited to one parameter, but may be a plurality of parameters; and (9) an eighth parameter, where the eighth parameter is used for the secondary node to obtain configuration information of the terminal on a physical downlink control channel of the SCG.

It can be understood that the eighth parameter may not be limited to one parameter, but may be a plurality of parameters.

In this embodiment of the present invention, the master node and/or secondary node of the terminal can perform transmission control based on power allocation reported by the terminal, for example, performing power control on uplink transmission in the MCG or SCG and optimizing network scheduling, thereby improving uplink transmission quality in the MCG or SCG.

The following provides description with reference to Embodiment 1, Embodiment 2, Embodiment 3, and Embodiment 4.

Embodiment 1

Step 1: An MN sends an MCG configuration to UE on MCG signaling radio bearer (SRB) 1.

Step 2: After receiving the MCG configuration, the UE calculates, based on a configuration parameter in the MCG configuration and some protocol-specified parameter values, one or more of $$T_{proc,2},\ T_{proc,CSI},\ T^{mux}_{proc,release},\ T^{mux}_{proc,2},\text{ and } T^{mux}_{proc,CSI},$$

and takes the largest one of the calculated values as $$T^{max}_{proc,MCG}.$$

Step 3: An SN sends an SCG configuration to the UE on SRB3.

Step 4: After receiving the SCG configuration, the UE calculates, based on a configuration parameter in the SCG configuration and some protocol-specified parameter values, $$T_{proc,2},\ T_{proc,CSI},\ T^{mux}_{proc,release},\ T^{mux}_{proc,2},\ \text{and}\ T^{mux}_{proc,CSI},$$

and takes largest one of the calculated values as $$T^{max}_{proc,SCG}.$$

Step 5: The UE sets the larger one of $$T^{max}_{proc,SCG}\ \text{and}\ T^{max}_{proc,MCG}$$

as T_offset.

Step 6: The UE sends information A to the MN, where the information A includes the T_offset.

Step 7: The MN performs network scheduling based on the T_offset.

Step 8: Optionally, the UE sends information B to the SN, where the information B includes the T_offset.

For example, the information B may be sent on MCG SRB1 or SRB3.

Step 9: The SN performs network scheduling based on the T_offset.

It can be understood that the foregoing information A and information B are equivalent to the first information.

Embodiment 2

Step 1: An MN sends an MCG configuration to UE on MCG SRB1.

Step 2: After receiving the MCG configuration, the UE calculates, based on a configuration parameter in the MCG configuration and some protocol-specified parameter values, $$T_{proc,2},\ T_{proc,CSI},\ T^{mux}_{proc,release},\ T^{mux}_{proc,2},\ \text{and}\ T^{mux}_{proc,CSI},$$

and takes the largest one of the calculated values as $$T^{max}_{proc,MCG}.$$

Step 3: An SN sends an SCG configuration to the UE on SRB3.

Step 4: After receiving the SCG configuration, the UE calculates, based on a configuration parameter in the SCG configuration and some protocol-specified parameter values, $$T_{proc,2},\ T_{proc,CSI},\ T^{mux}_{proc,release},\ T^{mux}_{proc,2},\ \text{and}\ T^{mux}_{proc,CSI},$$

and takes the largest one of the calculated values as $$T^{max}_{proc,SCG}.$$

Step 5: The UE sets the larger one of $$T^{max}_{proc,SCG}\ \text{and}\ T^{max}_{proc,MCG}$$

as T_offset.

Step 6: The UE sends information A to the MN, where the information A includes at least one of the following:

$$T^{max}_{proc,MCG},\ T^{max}_{proc,SCG},\ \text{and}\ T_{proc,2}$$

corresponding to the SCG, $$T_{proc,CSI},\ T^{mux}_{proc,release},\ T^{mux}_{proc,2},\ \text{and}\ T^{mux}_{proc,CSI}.$$

Step 7: The MN performs network scheduling based on the information A.

Step 8: The UE sends information B to the SN, where the information B includes at least one of the following:

$$T^{max}_{proc,MCG},\ T^{max}_{proc,SCG},\ \text{and}\ T_{proc,2}$$

corresponding to the MCG, $$T_{proc,CSI},\ T^{mux}_{proc,release},\ T^{mux}_{proc,2},\ \text{and}\ T^{mux}_{proc,CSI}.$$

Step 9: The SN performs network scheduling based on the information B.

It can be understood that the foregoing information A and information B are equivalent to the first information.

Embodiment 3

Step 1: UE will send information A to an MN.

Optionally, the information A includes at least one of the following:

$$T^{max}_{proc,MCG},\ T^{max}_{proc,SCG},\ \text{and}\ T_{proc,2}$$

corresponding to an MCG, $$T_{proc,CSI},\ T^{mux}_{proc,release},\ T^{mux}_{proc,2},\ T^{mux}_{proc,CSI},\ T_{proc,2},$$

$$\text{corresponding to and}\ SCG,\ T_{proc,CSI},\ T^{mux}_{proc,release},\ T^{mux}_{proc,2},\ \text{and}\ T^{mux}_{proc,CSI}.$$

Step 2: The MN sends information B to an SN.

Optionally, the information B includes at least one of the following: T_offset, $$T^{max}_{proc,MCG},$$

and $T_{proc,2}$ corresponding to the MCG, $$T_{proc,CSI},\ T^{mux}_{proc,release},\ T^{mux}_{proc,2},\ \text{and}\ T^{mux}_{proc,CSI},$$

and PDCCH configuration information of the MCG.

Optionally, the PDCCH configuration information includes one of the following:

(1) serving cell PDCCH configuration information in a serving cell configuration (UE-specific);

(2) PDCCH common configuration information in a common configuration of a downlink bandwidth part; and (3) PDCCH configuration information in a downlink bandwidth part configuration.

Step 3: The SN obtains an MCG PDCCH configuration from the information B and learns that the UE has received an MCG uplink transmission on a PUCCH of the MCG before T0–T_offset, and that the transmission overlaps an SCG uplink transmission at time T0. According to a power sharing mechanism for dual connectivity, an uplink transmission power of the UE on the SCG is decreased.

If the MCG has no uplink transmission for a long period of time after TO-T_offset, the SN may reschedule the UE to perform transmission with the maximum uplink power during this period of time, thereby avoiding low power transmission at time T0.

It can be understood that the foregoing information A and information B are equivalent to the first information.

Embodiment 4

Step 1: An MN sends an MCG configuration to UE on MCG SRB1.

Step 2: After receiving the MCG configuration, the UE calculates, based on a configuration parameter in the MCG configuration and some protocol-specified parameter values, $$T_{proc,2},\ T_{proc,CSI},\ T^{mux}_{proc,release},\ T^{mux}_{proc,2},\ \text{and}\ T^{mux}_{proc,CSI},$$

and takes the largest one of the calculated values as $$T^{max}_{proc,MCG}.$$

Step 3: An SN sends an SCG configuration to the UE on SRB3.

Step 4: After receiving the SCG configuration, the UE calculates, based on a configuration parameter in the SCG configuration and some protocol-specified parameter values, $$T_{proc,2},\ T_{proc,CSI},\ T^{mux}_{proc,release},\ T^{mux}_{proc,2},\ \text{and}\ T^{mux}_{proc,CSI},$$

and takes the largest one of the calculated values as $$T^{max}_{proc,SCG}.$$

Step 5: The UE sets the larger one of $$T^{max}_{proc,SCG},\ \text{and}\ T^{max}_{proc,MCG}$$

as T_offset.

Step 6: The UE sends information A to the MN, where the information A includes at least one of the following: parameters required to calculate $$T_{proc,2},\ T_{proc,CSI},\ T^{mux}_{proc,release},\ T^{mux}_{proc,2},\ \text{and}\ T^{mux}_{proc,CSI}$$

corresponding to the SCG, for example, a subcarrier spacing parameter.

Step 7: The MN performs network scheduling based on the information A.

Step 8: The UE sends information B to the SN, where the information B includes at least one of the following: parameters required to calculate $$T_{proc,2},\ T_{proc,CSI},\ T^{mux}_{proc,release},\ T^{mux}_{proc,2},\ \text{and}\ T^{mux}_{proc,CSI}$$

corresponding to the MCG, for example, a subcarrier spacing parameter.

Step 9: The SN performs network scheduling based on the information B.

It can be understood that the foregoing information A and information B are equivalent to the first information.

Figure 4:
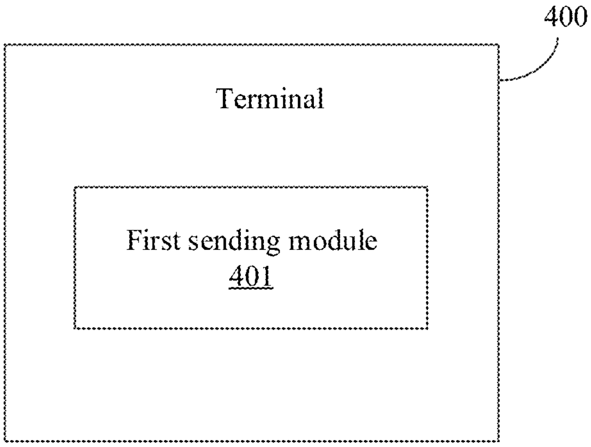
FIG. 4 is a schematic diagram of a terminal according to an embodiment of the present invention.

Referring to FIG. 4, an embodiment of the present invention further provides a terminal. The terminal 400 includes:

a first sending module 401, configured to send first information, where the first information is used to notify a master node and/or secondary node of the terminal of a power control parameter used by the terminal in an uplink power sharing mechanism for dual connectivity, so that the master node and/or the secondary node performs transmission control based on the first information.

In some embodiments, the first sending module 401 may directly send the first information to the master node; or the first sending module 401 sends the first information to the secondary node through the master node.

In some embodiments, the terminal sends the first information by using one of the following messages: (a) terminal assistance information; (b) RRC reconfiguration complete message; (c) terminal capability; (d) RRC connection resume complete message, and (e) RRC connection establishment complete message.

In some implementations, the first information may include at least one of the following:

(1) a time offset used in the uplink power sharing mechanism;

(2) a maximum processing time of the terminal on an MCG;

(3) a maximum processing time of the terminal on an SCG;

(4) a first parameter set, where the first parameter set is used for calculating the maximum processing time on the MCG; and (5) a second parameter set, where the second parameter set is used for calculating the maximum processing time on the SCG.

Optionally, the first parameter set includes at least one of the following:

(1) a PUSCH processing time of the terminal on the MCG

It can be understood that the PUSCH processing time is a duration from when the terminal receives the last symbol of a PDCCH for scheduling a PUSCH to when the UE starts to send the PUSCH.

(2) a CSI processing time of the terminal on the MCG (3) a PUSCH processing time of the terminal when a PUSCH of the MCG is multiplexed with a PUCCH and/or another PUSCH (4) a CSI processing time of the terminal on the MCG when a PUSCH or PUCCH for sending CSI is multiplexed with another PUCCH or PUSCH (5) an SPS PDSCH release processing time of the terminal on the MCG when a PUSCH or PUCCH for sending an SPS PDSCH release is multiplexed with another PUCCH and/or PUSCH (6) a third parameter, where the third parameter is used for the terminal to calculate one or more of the following:

a PUSCH processing time on the MCG or a CSI processing time on the MCG; and a PUSCH processing time, CSI processing time, or SPS PDSCH release processing time when a PUCCH or PUSCH of the MCG is multiplexed with another PUCCH and/or PUSCH.

It can be understood that the third parameter may not be limited to one parameter, but may be a plurality of parameters.

Optionally, the second parameter set includes at least one of the following:

(1) a PUSCH processing time of the terminal on the SCG;

(2) a CSI processing time of the terminal on the SCG;

(3) a PUSCH processing time of the terminal when a PUSCH of the SCG is multiplexed with a PUCCH and/or another PUSCH;

(4) a CSI processing time of the terminal on the SCG when a PUSCH or PUCCH for sending CSI is multiplexed with another PUCCH or PUSCH;

(5) an SPS PDSCH release processing time of the terminal on the SCG when a PUSCH or PUCCH for sending an SPS PDSCH release is multiplexed with another PUCCH and/or PUSCH; and (6) a fourth parameter, where the fourth parameter is used for the terminal to calculate one or more of the following:

a PUSCH processing time or CSI processing time on the SCG; and a PUSCH processing time, CSI processing time, or SPS PDSCH release processing time when a PUCCH or PUSCH of the SCG is multiplexed with another PUCCH and/or PUSCH.

It can be understood that the fourth parameter may not be limited to one parameter, but may be a plurality of parameters.

The terminal provided in this embodiment of the present invention may execute the foregoing method embodiment shown in FIG. 2, implementation principles and technical effects thereof are similar, and details are not described herein again.

Figure 5:
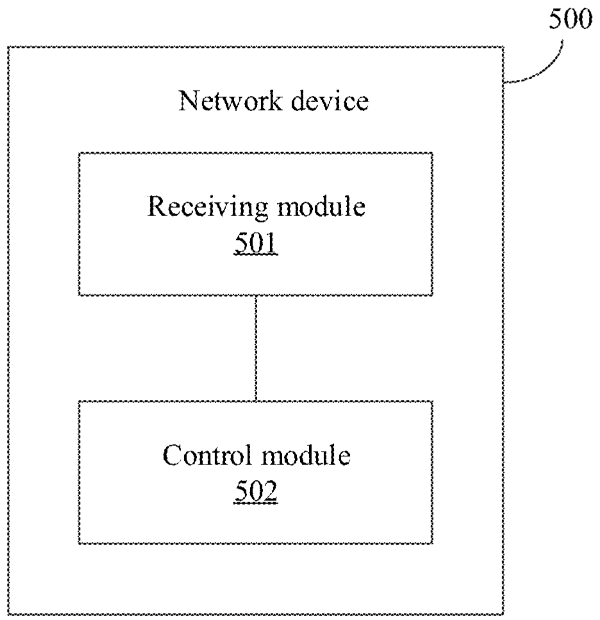
FIG. 5 is a schematic diagram of a network device according to an embodiment of the present invention.

Referring to FIG. 5, an embodiment of the present invention further provides a network device. The network device 500 includes:

a receiving module 501, configured to receive first information from a terminal, where the first information is used to notify a master node and/or secondary node of the terminal of a power control parameter used by the terminal in an uplink power sharing mechanism for dual connectivity; for example, the network device is a secondary node of the terminal, and the receiving module 501 may receive at least part of the first information from the terminal through the master node; and a control module 502, configured to perform transmission control for the terminal based on the first information.

Optionally, the performing transmission control for the terminal includes at least one of the following:

(1) controlling an uplink transmission power of the terminal for the master cell group For example, controlling an uplink transmission power of the terminal for any one serving cell in the master cell group.

(2) controlling an uplink transmission power of the terminal for the secondary cell group For example, controlling an uplink transmission power of the terminal for any one serving cell in the secondary cell group.

(3) optimizing network scheduling

For example, adjusting an uplink transmission location of the terminal in the master cell group; or scheduling the terminal to perform uplink transmission at an appropriate time; or controlling the terminal to prioritize or defer uplink transmission, or the like.

Optionally, the network device 500 is a master node of the terminal, and the network device 500 further includes:

a second sending module, configured to send second information to the secondary node of the terminal, where the second information includes at least one of the following:

(1) a time offset used in the uplink power sharing mechanism;

(2) a maximum processing time of the terminal on an MCG;

(3) a PUSCH processing time of the terminal on the MCG;

(4) a CSI processing time of the terminal on the MCG;

(5) a PUSCH processing time of the terminal when a PUSCH of the MCG is multiplexed with a PUCCH and/or another PUSCH;

(6) a CSI processing time of the terminal on the MCG when a PUSCH or PUCCH for sending CSI is multiplexed with another PUCCH and/or PUSCH;

(7) an SPS PDSCH release processing time of the terminal on the MCG when a PUSCH or PUCCH for sending an SPS PDSCH release is multiplexed with another PUCCH and/or PUSCH;

(8) a fifth parameter, where the fifth parameter is used for the terminal to calculate one or more of the following:

a PUSCH processing time or CSI processing time on the MCG; and a PUSCH processing time, CSI processing time, or SPS PDSCH release processing time when a PUCCH or PUSCH of the MCG is multiplexed with another PUCCH and/or PUSCH; where it can be understood that the fifth parameter may not be limited to one parameter, but may be a plurality of parameters; and (9) a sixth parameter, where the sixth parameter is used for the secondary node to obtain configuration information of the terminal on a physical downlink control channel of the MCG.

It can be understood that the sixth parameter may not be limited to one parameter, but may be a plurality of parameters.

Optionally, the terminal device 500 is a secondary node of the terminal, and the network device 500 further includes:

a third sending module, configured to send third information to the master node of the terminal, where the third information includes at least one of the following:

(1) a time offset used by the terminal in the uplink power sharing mechanism (2) a maximum processing time of the terminal on an SCG (3) a PUSCH processing time of the terminal on the SCG (4) a CSI processing time of the terminal on the SCG (5) a PUSCH processing time of the terminal when a PUSCH of the SCG is multiplexed with a PUCCH and/or another PUSCH (6) a CSI processing time of the terminal on the SCG when a PUSCH or PUCCH for sending CSI is multiplexed with another PUCCH or PUSCH (7) an SPS PDSCH release processing time of the terminal on the SCG when a PUSCH or PUCCH for sending an SPS PDSCH release is multiplexed with another PUCCH and/or PUSCH (8) a seventh parameter, where the seventh parameter is used for the terminal to calculate one or more of the following:

a PUSCH processing time or CSI processing time on the SCG; and a PUSCH processing time, CSI processing time, or SPS PDSCH release processing time when a PUCCH or PUSCH of the SCG is multiplexed with another PUCCH and/or PUSCH.

It can be understood that the seventh parameter may not be limited to one parameter, but may be a plurality of parameters.

(9) an eighth parameter, where the eighth parameter is used for the secondary node to obtain configuration information of the terminal on a physical downlink control channel of the SCG.

It can be understood that the eighth parameter may not be limited to one parameter, but may be a plurality of parameters.

The network device provided in this embodiment of the present invention may execute the foregoing method embodiment shown in FIG. 3, implementation principles and technical effects thereof are similar, and details are not described herein again.

Figure 6:
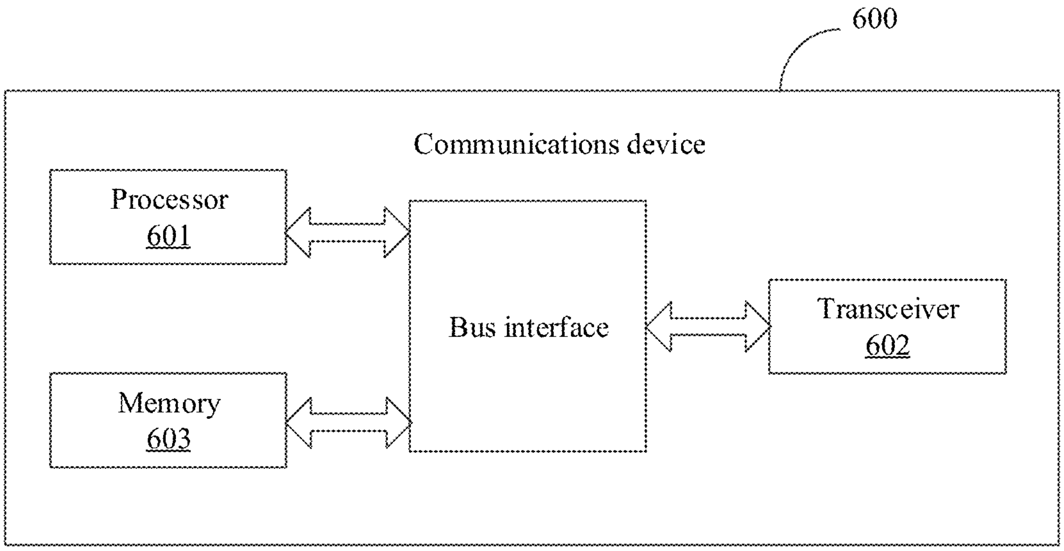
FIG. 6 is a schematic diagram of a communications device according to an embodiment of the present invention.

Referring to FIG. 6, FIG. 6 is a structural diagram of a communications device to which an embodiment of the present invention is applied. As shown in FIG. 6, the communications device 600 includes a processor 601, a transceiver 602, a memory 603, and a bus interface.

In an embodiment of the present invention, the communications device 600 further includes a computer program stored in the memory 603 and capable of running on the processor 601. When the computer program is executed by the processor 601, the steps of the method shown in FIG. 2 or FIG. 3 are implemented.

In FIG. 6, a bus architecture may include any quantity of interconnected buses and bridges, and specifically connects together circuits that are of one or more processors represented by the processor 601 and of a memory represented by the memory 603. The bus architecture may further interconnect various other circuits such as a peripheral device, a voltage regulator, and a power management circuit. These are all common sense in the art, and therefore are not further described in this specification. The bus interface provides interfaces. The transceiver 602 may be a plurality of components, including a transmitter and a receiver, and provides units for communicating with various other apparatuses on a transmission medium. It can be understood that the transceiver 602 is an optional component.

The processor 601 is responsible for management of the bus architecture and general processing, and the memory 603 may store data for use by the processor 601 when the processor 601 performs an operation.

The communications device provided in this embodiment of the present invention can execute the foregoing method embodiment shown in FIG. 2 or FIG. 3, implementation principles and technical effects thereof are similar, and details are not described herein again.

Method or algorithm steps described with reference to the content disclosed in the present invention may be implemented by hardware, or may be implemented by a processor executing software instructions. The software instructions may include a corresponding software module. The software module may be stored in a random access memory (RAM), a flash memory, a read-only memory (ROM), an erasable programmable read-only memory (EPROM), an Electrically EPROM (EEPROM), a register, a hard disk, a removable hard disk, a compact disc read-only memory, or any other form of storage medium well-known in the art. For example, a storage medium is coupled to the processor, enabling the processor to read information from the storage medium and write information into the storage medium. Certainly, the storage medium may alternatively be a component of the processor. The processor and the storage medium may be located in an application-specific integrated circuit (ASIC). In addition, the ASIC may be located in a core network interface device. Certainly, the processor and the storage medium may exist in the core network interface device as discrete components.

A person skilled in the art should be aware that, in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium.

The computer-readable medium includes a computer storage medium and a communication medium, where the communication medium includes any medium that enables a computer program to be transmitted from one place to another place. The storage medium may be any available medium accessible by a general-purpose or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a special-purpose computer, an embedded processor, or a processor of another programmable data processing device to generate a machine, so that the instructions, when executed by the computer or the processor of the another programmable data processing device, produce a means for implementing a specific function in one or more processes in the flowcharts and/or in one or more blocks in the block diagrams.

These computer program instructions may alternatively be stored in a computer-readable memory that can direct a computer or another programmable data processing device to work in a specific manner, so that the instructions stored in the computer-readable memory produce an artifact that includes an instruction apparatus. The instruction apparatus implements a specific function in one or more processes in the flowcharts and/or in one or more blocks in the block diagrams.

These computer program instructions may be loaded onto a computer or any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

It can be clearly understood by a skilled person in the art that, for convenient and brief description, for a detailed working process of the systems, apparatuses, and units in the foregoing description, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. In implementation by hardware, modules, units, and subunits may be implemented in one or more application-specific integrated circuits (ASIC), digital signal processors (DSP), DSP Device (DSPD), programmable logic devices (PLD), field-programmable gate arrays (FPGA), general-purpose processors, controllers, microcontrollers, microprocessors, other electronic units used to implement the functions described in this disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

Obviously, a person skilled in the art can make various modifications and variations to the embodiments of the present invention without departing from the spirit and scope of the present invention. The present invention is intended to cover these modifications and variations provided that they fall within the scope of protection defined by the following claims and their equivalent technologies.

What is claimed is:

1. A method for transmission control, comprising:

receiving, by a master node of a terminal, first information from the terminal, wherein the first information is used to notify at least one of the master node or a secondary node of the terminal of a power control parameter used by the terminal in an uplink power sharing mechanism for dual connectivity;

performing, by the master node, transmission control for the terminal based on the first information; and sending, by the master node, second information to the secondary node of the terminal, wherein the second information comprises a time offset used by the terminal in the uplink power sharing mechanism, the time offset is used to determine a time period prior to time T0, and, at the time T0 a SCG uplink transmission is started.

2. The method according to claim 1, wherein the second information further comprises at least one of the following:

a maximum processing time of the terminal on an MCG;

a PUSCH processing time of the terminal on the MCG;

a CSI processing time of the terminal on the MCG;

a PUSCH processing time of the terminal when a PUSCH of the MCG is multiplexed with a PUCCH or another PUSCH;

a CSI processing time of the terminal on the MCG when a PUSCH or PUCCH for sending CSI is multiplexed with another PUCCH or PUSCH;

an SPS PDSCH release processing time of the terminal on the MCG when a PUSCH or PUCCH for sending an SPS PDSCH release is multiplexed with another PUCCH or PUSCH;

a fifth parameter, wherein the fifth parameter is used for the terminal to calculate one or more of the following:

a PUSCH processing time or CSI processing time on the MCG; and a PUSCH processing time, CSI processing time, or SPS PDSCH release processing time when a PUCCH or PUSCH of the MCG is multiplexed with another PUCCH or PUSCH; and a sixth parameter, wherein the sixth parameter is used for the secondary node to obtain related configuration information of the terminal on a physical downlink control channel of the MCG.

3. A method for transmission control, comprising:

receiving, by a secondary node of a terminal, first information from the terminal, wherein the first information is used to notify at least one of a master nod or the secondary node of the terminal of a power control parameter used by the terminal in an uplink power sharing mechanism for dual connectivity;

performing, by the secondary node, transmission control for the terminal based on the first information; and sending, by the secondary node, third information to the master node of the terminal, wherein the third information comprises at least one of the following:

a time offset used by the terminal in the uplink power sharing mechanism, wherein the time offset is used to determine a time period prior to time T0, and at the time T0 a SCG uplink transmission is started; or a maximum processing time of the terminal on an SCG.

4. The method according to claim 3, wherein the receiving first information from the terminal comprises: receiving at least part of the first information from the terminal through the master node.

5. The method according to claim 3, wherein the third information further comprises at least one of the following:

a PUSCH processing time of the terminal on the SCG;

a CSI processing time of the terminal on the SCG;

a PUSCH processing time of the terminal when a PUSCH of the SCG is multiplexed with a PUCCH or another PUSCH;

a CSI processing time of the terminal on the SCG when a PUSCH or PUCCH for sending CSI is multiplexed with another PUCCH or PUSCH;

an SPS PDSCH release processing time of the terminal on the SCG when a PUSCH or PUCCH for sending an SPS PDSCH release is multiplexed with another PUCCH or PUSCH;

a seventh parameter, wherein the seventh parameter is used for the terminal to calculate one or more of the following:

a PUSCH processing time or CSI processing time on the SCG; and a PUSCH processing time, CSI processing time, or SPS PDSCH release processing time when a PUCCH or PUSCH of the SCG is multiplexed with another PUCCH or PUSCH; and an eighth parameter, wherein the eighth parameter is used for the master node to obtain related configuration information of the terminal on a physical downlink control channel of the SCG.

6. A master node, comprising:

at least one hardware processor; and a memory storing a program executable by the at least one hardware processor that, when executed, directs the at least one hardware processor to:

receive first information from a terminal, wherein the first information is used to notify at least one of the master node or a secondary node of the terminal of a power control parameter used by the terminal in an uplink power sharing mechanism for dual connectivity;

perform transmission control for the terminal based on the first information; and send second information to the secondary node of the terminal, wherein the second information comprises a time offset used by the terminal in the uplink power sharing mechanism, the time offset is used to determine a time period prior to time T0, and at the time T0 a SCG uplink transmission is started.

7. The master node according to claim 6, wherein the second information further comprises at least one of the following:

a maximum processing time of the terminal on an MCG;

a PUSCH processing time of the terminal on the MCG;

a CSI processing time of the terminal on the MCG;

a PUSCH processing time of the terminal when a PUSCH of the MCG is multiplexed with a PUCCH or another PUSCH;

a CSI processing time of the terminal on the MCG when a PUSCH or PUCCH for sending CSI is multiplexed with another PUCCH or PUSCH;

an SPS PDSCH release processing time of the terminal on the MCG when a PUSCH or PUCCH for sending an SPS PDSCH release is multiplexed with another PUCCH or PUSCH;

a fifth parameter, wherein the fifth parameter is used for the terminal to calculate one or more of the following:

a PUSCH processing time or CSI processing time on the MCG; and a PUSCH processing time, CSI processing time, or SPS PDSCH release processing time when a PUCCH or PUSCH of the MCG is multiplexed with another PUCCH or PUSCH; and a sixth parameter, wherein the sixth parameter is used for the secondary node to obtain related configuration information of the terminal on a physical downlink control channel of the MCG.

8. A secondary node, comprising:

at least one hardware processor; and a memory configured to store a program executable by the at least one hardware processor that, when executed, directs the at least one hardware processor to perform the method according to claim 3.

* * * * *